United States Patent
Kakadjian et al.

(10) Patent No.: US 11,932,811 B2
(45) Date of Patent: Mar. 19, 2024

(54) COMPOSITION AND METHODS FOR ENHANCING THE PRODUCTION OF HYDROCARBONS

(71) Applicants: Sarkis Kakadjian, The Woodlands, TX (US); Amanda Flowers, The Woodlands, TX (US); Richard Arriaga, The Woodlands, TX (US); Duane S. Treybig, The Woodlands, TX (US)

(72) Inventors: Sarkis Kakadjian, The Woodlands, TX (US); Amanda Flowers, The Woodlands, TX (US); Richard Arriaga, The Woodlands, TX (US); Duane S. Treybig, The Woodlands, TX (US)

(73) Assignee: NexTier Completion Solutions Inc., Houston, TX (US)

(*) Notice: Subject to any disclaimer, the term of this patent is extended or adjusted under 35 U.S.C. 154(b) by 0 days.

(21) Appl. No.: 17/877,901

(22) Filed: Jul. 30, 2022

(65) Prior Publication Data
US 2023/0159815 A1 May 25, 2023

Related U.S. Application Data

(62) Division of application No. 16/845,787, filed on Apr. 10, 2020, now Pat. No. 11,453,818.

(51) Int. Cl.
*E21B 43/267* (2006.01)
*C09K 8/60* (2006.01)
*C09K 8/68* (2006.01)
*C09K 8/70* (2006.01)
*C09K 8/80* (2006.01)
*E21B 43/26* (2006.01)

(52) U.S. Cl.
CPC ............ *C09K 8/602* (2013.01); *C09K 8/68* (2013.01); *C09K 8/70* (2013.01); *C09K 8/80* (2013.01); *E21B 43/26* (2013.01); *C09K 2208/10* (2013.01); *E21B 43/267* (2013.01)

(58) Field of Classification Search
CPC . C09K 8/602; C09K 8/68; C09K 8/70; C09K 8/80; C09K 2208/10; E21B 43/26; E21B 43/267
See application file for complete search history.

(56) References Cited

U.S. PATENT DOCUMENTS

| | | |
|---|---|---|
| 4,457,372 A | 7/1984 | Doster et al. |
| 5,197,544 A | 3/1993 | Hines |
| 6,232,274 B1 | 5/2001 | Huges et al. |

(Continued)

FOREIGN PATENT DOCUMENTS

| | | | | |
|---|---|---|---|---|
| EP | 3144366 A1 * | 3/2017 | ........... | B01D 17/047 |
| WO | 2016-018350 A1 | 2/2016 | | |

*Primary Examiner* — Angela M DiTrani Leff
(74) *Attorney, Agent, or Firm* — Robert W. Strozier (57) ABSTRACT

Colloid and/or micelle nano-sizing compositions including a nano-sizing solvent system comprising one or more sesquiterpene solvents, and a nano-sizing activator system comprising one or more dibasic esters, surfactant systems containing colloid and/or micelle nano-sizing compositions, treating/fracturing/completion fluids containing the colloid and/or micelle nano-sizing compositions and methods for making and using same.

16 Claims, 1 Drawing Sheet

Crude Oil Recovery by Inhibition 100% Brackish Water Containing the Indicated Surfactant System with Crude Oil Saturated 5/10 Mesh Shate (56) References Cited

U.S. PATENT DOCUMENTS

| | | | |
|---|---|---|---|
| 7,691,792 B1* | 4/2010 | Fisher | C07C 13/18 |
| | | | 508/110 |
| 8,157,010 B2 | 4/2012 | Murphy et al. | |
| 9,068,068 B2 | 6/2015 | Lee et al. | |
| 9,200,192 B2 | 12/2015 | Zelenev et al. | |
| 9,222,013 B1 | 12/2015 | Champagne et al. | |
| 9,701,888 B2 | 7/2017 | Nguyen | |
| 9,884,988 B2 | 2/2018 | Dismuke et al. | |
| 11,453,818 B2* | 9/2022 | Kakadjian | C09K 8/80 |
| 2012/0213727 A1* | 8/2012 | Hazan | A61K 31/01 |
| | | | 514/762 |
| 2013/0035234 A1* | 2/2013 | Estrine | A01N 37/10 |
| | | | 504/323 |
| 2013/0217611 A1* | 8/2013 | Caballero | C11D 1/62 |
| | | | 510/417 |
| 2014/0284053 A1* | 9/2014 | Germack | C09K 8/26 |
| | | | 166/279 |
| 2014/0357533 A1* | 12/2014 | Wells | C09K 8/20 |
| | | | 507/126 |
| 2015/0252249 A1 | 9/2015 | Hill et al. | |
| 2015/0315520 A1* | 11/2015 | Eppler | A61Q 19/00 |
| | | | 514/789 |
| 2017/0183560 A1 | 6/2017 | McDaniel et al. | |
| 2019/0218476 A1* | 7/2019 | Blondeau | C11B 9/008 |

\* cited by examiner

COMPOSITION AND METHODS FOR ENHANCING THE PRODUCTION OF HYDROCARBONS

RELATED APPLICATIONS

This application is a divisional of U.S. patent Ser. No. 16/845,787 filed Apr. 10, 2020 (10 Apr. 2020), which claims priority to and the benefit of U.S. Provisional Patent Application Ser. No. 62/832,601 filed Apr. 11, 2019 (11 Apr. 2019).

BACKGROUND OF THE DISCLOSURE

1. Field of the Disclosure

Embodiments of the present disclosure relate to: (a) colloid and/or micelle nano-sizing compositions including an amount of a Component A and/or an amount of a Component B, (b) surfactant compositions including a colloid and/or micelle nano-sizing compositions, and (c) treating fluid compositions a surfactant composition including a colloid and/or micelle nano-sizing compositions and methods for making and using same.

In particular, embodiments of the present disclosure relate to: (a) colloid and/or micelle nano-sizing compositions including an amount of a Component A and/or an amount of a Component B, (b) to surfactant compositions including a colloid and/or micelle nano-sizing compositions, and (c) treating fluid compositions a surfactant composition including a colloid and/or micelle nano-sizing compositions and methods for making and using same, wherein the Component A includes a nano-sizing solvent system and the Component B includes a nano-sizing activator system, wherein the nano-sizing solvent system includes one or more polyterpene solvents, and wherein the nano-sizing activator systems includes one or more dibasic esters.

2. Description of the Related Art

Currently, shale fracturing involves the use of new generation of nano-surfactants to penetrate small pore throats. These surfactant-packages do not always guarantee to be in the order of true nano-surfactant packages (<100 nM) or the interfacial tension are not low enough.

Thus, there is still a need in the art for improved systems and methods for flow back aids having colloid or micelle diameters less than 100 nm, having lower interfacial tension between crude oil and the stimulation chemicals, having lower cost, and improving oil production.

SUMMARY OF THE DISCLOSURE

Nano-Sizing Compositions

Embodiments of this disclosure provide colloid and/or micelle nano-sizing compositions including (a) a Component A including a nano-sizing solvent system, and (b) a Component B including a nano-sizing activator system. The nano-sizing solvent system includes one or more polyterpene solvents. The nano-sizing activator systems includes one or more dibasic esters.

Surfactant Compositions Including the Nano-Sizing Compositions

Embodiments of this disclosure provide surfactant compositions including (a) one or more surfactants, and (b) a colloid and/or micelle nano-sizing compositions including (1) a Component A including a nano-sizing solvent system, and (2) a Component B including a nano-sizing activator system. The nano-sizing solvent system includes one or more polyterpene solvents. The nano-sizing activator systems includes one or more dibasic esters.

Proppant Free Fracturing Fluids Including the Nano-Sizing Compositions

Embodiments of this disclosure provide fracturing fluids including an effective amount of a surfactant composition including (a) one or more surfactants and (b) a colloid and/or micelle nano-sizing composition including (1) a Component A including a nano-sizing solvent system and (2) a Component B including a nano-sizing activator system. The nano-sizing solvent system includes one or more polyterpene solvents. The nano-sizing activator systems includes one or more dibasic esters.

Proppant Containing Fracturing Fluids Including the Nano-Sizing Compositions

Embodiments of this disclosure provide fracturing fluids including a surfactant composition including (a) one or more surfactants and (b) a colloid and/or micelle nano-sizing composition including (1) a Component A including a nano-sizing solvent system and (2) a Component B including a nano-sizing activator system and a proppant. The nano-sizing solvent system includes one or more polyterpene solvents. The nano-sizing activator systems includes one or more dibasic esters.

Methods of Making Fracturing Fluids

Embodiments of this disclosure provide methods of making a fracturing or completion fluid composition including a surfactant composition including (a) one or more surfactants and (b) a colloid and/or micelle nano-sizing compositions including (1) a Component A including a nano-sizing solvent system and (2) a Component B including a nano-sizing activator system with or without a proppant with mixing to form a nano-sized colloid and/or micelle fracturing fluid composition. The nano-sizing solvent system includes one or more polyterpene solvents. The nano-sizing activator systems includes one or more dibasic esters.

Methods of Fracturing a Formation

Embodiments of this disclosure provide methods of fracturing a formation using a fracturing or completion fluid composition including a surfactant composition including (a) one or more surfactants and (b) a colloid and/or micelle nano-sizing compositions including (1) a Component A including a nano-sizing solvent system and (2) a Component B including a nano-sizing activator system with or without a proppant with mixing to form a nano-sized colloid and/or micelle fracturing fluid composition, wherein the methods include injecting one or more fracturing fluids into a formation under fracturing conditions. In certain embodiments, the one or more fracturing fluids include: (a) colloid and/or micelle nano-sizing composition free and proppant free fluids, (b) proppant free fluids containing a colloid and/or micelle nano-sizing compositions of this disclosure, (c) colloid and/or micelle nano-sizing composition free fluids including proppant; and/or (d) fluids including a colloid and/or micelle nano-sizing compositions of this disclosure and proppant. The nano-sizing solvent systems include one or more polyterpene solvents. The nano-sizing activator systems include one or more dibasic esters. In certain embodiments, the fracturing fluids are injected according to a desired injection protocol. In other embodiments, the injection protocol includes injecting the four fluids (a-d) in a sequence to build islands or pillars inside fractures during hydraulic fracturing. In certain embodiments, the surfactant compositions of this invention may also be used in completion applications as a completion fluid.

BRIEF DESCRIPTION OF THE DRAWINGS OF THE DISCLOSURE

The disclosure may be better understood with reference to the following detailed description together with the appended illustrative drawings in which like elements are numbered the same.

DEFINITIONS USED IN THE DISCLOSURE

Figure 1:
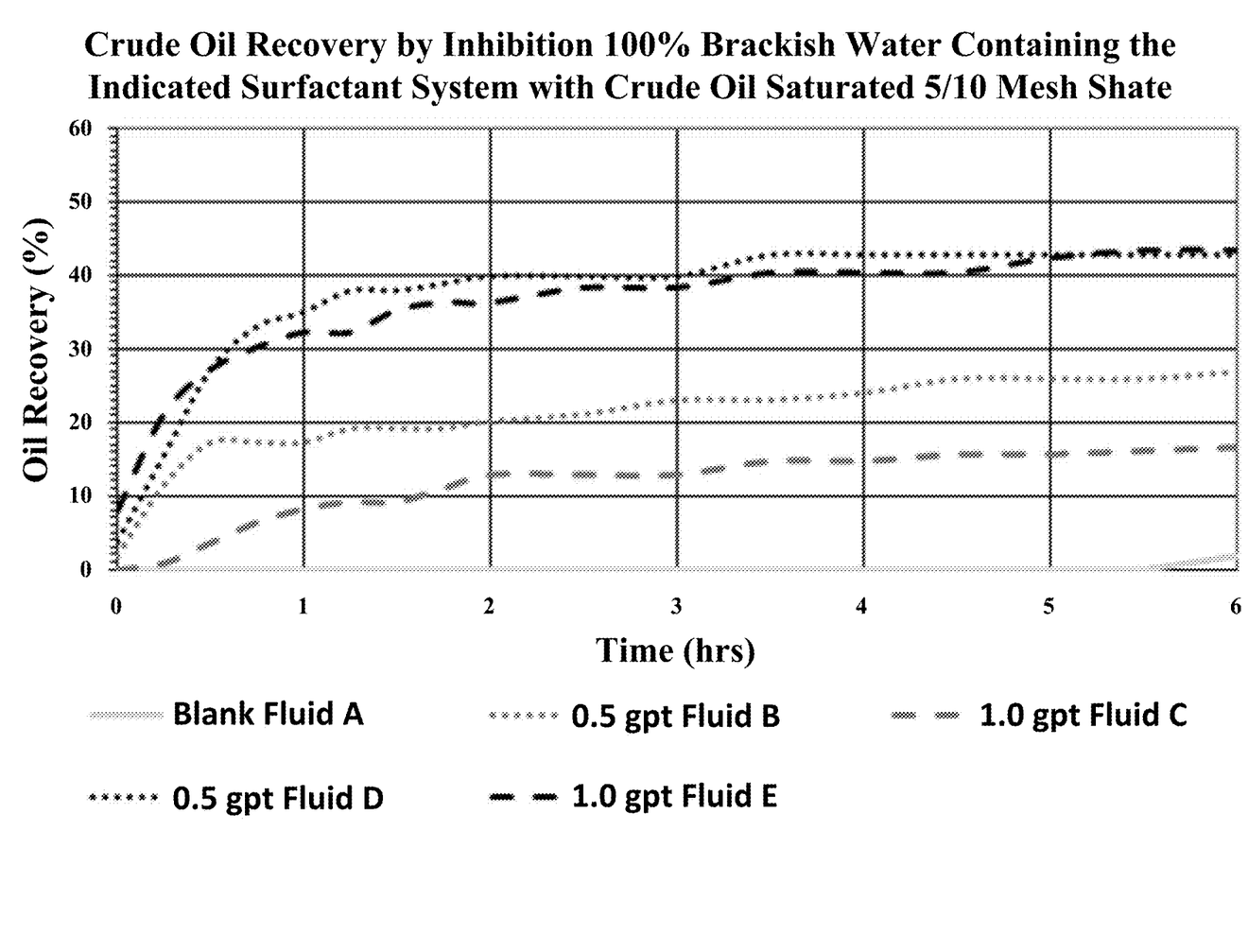
The FIGURE depicts a plot of percentage of percent oil recovery against time in hours is shown for (a) a Blank or Control composition including no surfactant package, (b) a composition including 0.5 gpt of Comparative Example 6, (c) a composition including 1.0 gpt of Comparative Example 6, (d) a composition including 0.5 gpt of Example 5, and (e) a composition including 1.0 gpt of Example 5.

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within +20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "downhole fluids" as used in this application means any fluid that is used to treat formation including, without limitations, fracturing fluids with or without proppants, completion fluids, treating fluids, and/or any other type of fluid that is used downhole to enhance oil and/or gas production for an oil and/or gas well.

The term "fracturing" refers to the process and methods of breaking down a geological formation, i.e. the rock formation around a well bore, by pumping fluid at very high pressures, in order to increase production rates from a hydrocarbon reservoir. The fracturing methods of this disclosure use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present disclosure include, but are not limited to, conventional proppants familiar to those skilled in the art such as sand (e.g., 20-40 mesh sand, 30-50 mesh sand, 100 mesh sand, etc.), resin-coated sand, sintered bauxite, glass beads, and similar materials.

The term "resin coated proppant" means any proppant coated with a resin or polymeric material such as resin coated proppants from CARBO Ceramics Inc., Hexion, Fairmount Santrol, or other resin coated proppants.

The term "hydrophobic proppant" or "hydrophobically modified proppant" means any proppant coated with a polymer to render the proppant hydrophobic such as coating a silicon containing compound.

The term "fracturing layer" is used to designate a layer, or layers, of rock that are intended to be fractured in a single fracturing treatment. It is important to understand that a fracturing layer may include one or more than one of rock layers or strata as typically defined by differences in permeability, rock type, porosity, grain size, Young's modulus, fluid content, or any of many other parameters. That is, a fracturing layer is the rock layer or layers in contact with all the perforations through which fluid is forced into the rock in a given treatment. The operator may choose to fracture, at one time, a fracturing layer that includes water zones and hydrocarbon zones, and/or high permeability and low permeability zones (or even impermeable zones such as shale zones) etc. Thus, a fracturing layer may contain multiple regions that are conventionally called individual layers, strata, zones, streaks, pay zones, etc., and we use such terms in their conventional manner to describe parts of a fracturing layer. Typically the fracturing layer contains a hydrocarbon reservoir, but the methods may also be used for fracturing water wells, storage wells, injection wells, etc. Note also that some embodiments of the disclosure are described in terms of conventional circular perforations (for example, as created with shaped charges), normally having perforation tunnels. However, the disclosure may also be practiced with other types of perforations, for example openings or slots cut into the tubing by jetting.

The term "fracturing conditions" means conditions of a fluid temperature up to 350° F., a fluid injection pressure up to 15,000 pound per square inch (psi), fluid injection rate up to 150 barrel per minute. In other situations, fracturing conditions pertain to conditions under which an oil and gas wells are fractured to increase gas and oil production from the well. The operating pressures may vary significantly. For example, oil and gas wells may cycle from a shut-in condition, in which the pressure within the well is maintained at a maximum, to a producing condition, in which the pressure within the well is much lower. Further, the flowing conditions can change resulting in cycles of a higher or lower pressure within the well. This "pressure cycling" of a hydraulically fractured well is known to cause damage to proppant in the fracture due to rearrangement and re-stressing of the proppant grains. This results in a less conductive proppant pack in the fracture and adversely impacts production performance of the well. Consequently, a proppant that is resistant to pressure cycling conductivity loss is desirable. The conditions may include temperature, pressure, and injection rate. The temperature is generally the well temperature, but heated or cooled fracturing fluids may be used to change the temperature. The pressures, while varying based on formation type, generally is greater than about 10,000 psi. In other embodiments, greater than about 15,000 psi. In other embodiments, greater than about 20,000 psi. In other embodiments, greater than about 25,000 psi. In other embodiments, greater than about 30,000 psi. The injection rate is designed to maintain the fracturing pressures during the fracturing operations, which may include a single injection or a plurality of injections, generally in a periodic manner. Completion conditions may be the same or different from fracturing conditions, but again will depend on the formation to be fractured.

The term "colloid" means a mixture in which one substance of microscopically dispersed insoluble particles is suspended throughout another substance.

The term "micelle" means a loosely bound aggregation of several tens or hundreds of atoms, ions (electrically charged atoms), or molecules, forming a colloidal particle, i.e., one of a number of ultramicroscopic particles dispersed through some continuous medium.

The term "sesquiterpenes" represents a class of terpenes including three isoprene units of the general formula $C_{15}H_{24}$.

The term "cationic surfactants" means surfactants having a positively charged head-group and include mono alkyl quaternary salts, esterquats, or mixtures thereof.

The term "anionic surfactants" means surfactants having a negatively charged head-group and include alkylbenzene sulfonates, alkyl sulfates, alkyl ether sulfates, and soaps.

The term "zwitterionic surfactants" or "amphoteric surfactants" means surfactants that include a positively charged moiety and a negatively charged moiety.

The term "nonionic surfactants" means surfactants that include no charged moieties.

The term "mixture" means an intimate combination of two or more components.

The term "combination" means a use of two material together, but not an intimate mixture such as using two different fluids components that are not mixed before hand.

The term "plurality" means two or more, more than two, greater than or equal to 2, or $\geq 2$.

The term "at least one" means one or a plurality, one or more, greater than or equal to 1, or $\geq 1$.

The term "mm" means millimeters B $10^3$ meters.

The term "μm" or "micron" means micrometers B $10^6$ meters.

The term "nm" means nanometers B $10^9$ meters.

The term "pm" means picometers B $10^{12}$ meters.

The term "gpt" means gallons per thousand gallons.

The term "ppt" means pounds per thousand gallons.

The term "wt. %" or "w/w" means percent by weight.

The term "vol. %" or "v/v" means percent by volume.

The term "v/w" means volume of a substance per unit of weight (mass) of another component.

DETAILED DESCRIPTION OF THE DISCLOSURE

The inventors have found that nano sizing agents and nano sizing agent activators may be produced to aid in reducing sizes of anionic, cationic, zwitterionic, and/or non-ionic surfactant colloids or micelles at or below about 100 nm (100 nm), at or below about 75 nm 75 nm), at or below about 50 nm (50 nm), between about 100 nm and about 10 nm, between about 100 nm and about 25 nm, or between about 100 nm and about 50 nm, which may be demonstrated using with imbibition testing. When surfactant colloids or micelles are reduced to 100 nm, 75 nm, or 50 nm or less, the interfacial tension can be lowered and more hydrocarbon, water or both is produced in gravity load recovery.

In hydraulic fracturing of shale, the fractures may vary from 0.27 mm (270,000 nm) to 3.6 mm (3,600,000 nm). Pore sizes in the shale are variable and complex. The pore sizes in the Devonian Woodford Shale in the Permian Basin, Mississippian Barnett Shale in Fort Worth Basin, Pennsylvanian Atoka Shale in the Permian Basin, Jurassic Haynesville and Bossier Shales in East Texas Basin, Lower Cretaceous Pearsall Shale in southwest Texas and Upper Cretaceous Eagle Ford Shale in south Texas and Marcellus Shale vary from 5 nm to several microns >1000 nm.

The inventors have also found that fracturing fluids including colloids or micelles having particles sizes between about 100 nm penetrate deeper into fractures and/or pores of oil/gas bearing shales resulting in increased oil/gas production.

Nano-Sizing Compositions

Embodiments of this disclosure broadly related to colloid and/or micelle nano-sizing compositions including (a) a Component A including a nano-sizing solvent system and (b) a Component B including a nano-sizing activator system. The nano-sizing solvent system includes one or more polyterpene solvents. The nano-sizing activator systems includes one or more dibasic esters.

Surfactant Compositions

Embodiments of this disclosure broadly related to surfactant compositions including (a) one or more surfactants and (b) a colloid and/or micelle nano-sizing compositions including (1) a Component A including a nano-sizing solvent system and (2) a Component B including a nano-sizing activator system. The nano-sizing solvent system includes one or more polyterpene solvents. The nano-sizing activator systems includes one or more dibasic esters.

Proppant Free Fracturing or Completion Fluids

Embodiments of this disclosure broadly related to fracturing or completion fluid compositions including surfactant compositions including (a) one or more surfactants and (b) a colloid and/or micelle nano-sizing compositions including (1) a Component A including a nano-sizing solvent system and (2) a Component B including a nano-sizing activator system. The nano-sizing solvent system includes one or more polyterpene solvents. The nano-sizing activator systems includes one or more dibasic esters.

Proppant Containing Fracturing or Completion Fluids

Embodiments of this disclosure broadly related to fracturing or completion fluid compositions including surfactant compositions including (a) one or more surfactants and (b) a colloid and/or micelle nano-sizing compositions including (1) a Component A including a nano-sizing solvent system and (2) a Component B including a nano-sizing activator system and a proppant. The nano-sizing solvent system includes one or more polyterpene solvents. The nano-sizing activator systems includes one or more dibasic esters.

Methods of Making Nano-Sizing Compositions

Embodiments of this disclosure broadly related to methods of making colloid and/or micelle nano-sizing compositions including adding or contacting including contacting, with mixing, (a) a Component A including a nano-sizing solvent system and (b) a Component B including a nano-sizing activator system. The nano-sizing solvent system includes one or more polyterpene solvents. The nano-sizing activator systems includes one or more dibasic esters.

Methods of Making Surfactant Compositions

Embodiments of this disclosure broadly related to methods of making surfactant compositions including adding or contacting (a) one or more surfactants and (b) a colloid and/or micelle nano-sizing compositions including (1) a Component A including a nano-sizing solvent system and (2) a Component B including a nano-sizing activator system. The nano-sizing solvent system includes one or more polyterpene solvents. The nano-sizing activator systems includes one or more dibasic esters.

Methods of Making Fracturing Fluids

Embodiments of this disclosure broadly related to methods of making a fracturing fluid compositions including adding or contacting a base fluid, (a) one or more surfactants, and (b) a colloid and/or micelle nano-sizing compositions including (1) a Component A including a nano-sizing solvent system and (2) a Component B including a nano-sizing activator system. In certain embodiments, the method further includes adding a proppant to the fracturing fluid. The nano-sizing solvent system includes one or more polyterpene solvents. The nano-sizing activator systems includes one or more dibasic esters.

Methods of Fracturing a Formation

Embodiments of this disclosure provide methods of fracturing including injecting one or more fracturing fluids into a formation under fracturing conditions, wherein the one or more fracturing fluids include: (a) colloid and/or micelle nano-sizing composition free and proppant free fluids, (b) proppant free fluids containing a colloid and/or micelle nano-sizing compositions of this disclosure, (c) colloid and/or micelle nano-sizing composition free fluids including proppant; and/or (d) fluids including a colloid and/or micelle nano-sizing compositions of this disclosure and proppant. The nano-sizing solvent systems include one or more polyterpene solvents. The nano-sizing activator systems include one or more dibasic esters. In certain embodiments, the fracturing fluids are injected according to a desired injection protocol. In other embodiments, the injection protocol includes injecting the four fluids (a-d) in a sequence to build islands or pillars inside fractures during hydraulic fracturing.

Specific Embodiments

Embodiments of the disclosure include colloid and/or micelle nano-sizing compositions including a nano-sizing solvent system comprising one or more polyterpene solvents; and a nano-sizing activator system comprising one or more dibasic esters. In certain embodiments, the polyterpene solvents comprise one or more sesquiterpenes of the general molecular formula $C_{15}H_{24}$ composed of three isoprene units; and the dibasic esters comprise a single dialkyl dibasic ester or a mixture of dialkyl dibasic esters, wherein the alkyl group have between 1 and 8 carbon atoms. In other embodiments, the sesquiterpenes include humulenes, farnesenes, or mixtures thereof; and the dialkyl dibasic esters comprise one or more dimethyl dibasic esters. In other embodiments, the humulenes include α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; the farnesenes include α-farnesene (3,7,11-trimethyl-1,3,6,10-dodecatetraene), β-farnesene (7,11-dimethyl-3-methylene-1,6,10-dodecatriene), or mixtures thereof; the dimethyl dibasic esters include dimethyl $C_4$-$C_{12}$ dibasic esters, dimethyl $C_4$-$C_{10}$ dibasic esters, dimethyl $C_4$-$C_8$ dibasic esters, dimethyl $C_4$-$C_6$ dibasic esters, or mixtures thereof. In other embodiments, the sesquiterpenes include farnesenes; and the dimethyl dibasic esters include dimethyl $C_4$-$C_6$ dibasic esters. In other embodiments, the farnesenes include α-farnesene (3,7,11-trimethyl-1,3,6,10-dodecatetraene), β-farnesene (7,11-dimethyl-3-methylene-1,6,10-dodecatriene), or mixtures thereof; and dimethyl $C_4$-$C_6$ dibasic esters include: dimethyl glutarate, dimethyl adipate, dimethyl succinate, or mixtures thereof.

Embodiments of the disclosure include surfactant compositions comprising: one or more surfactants, and a colloid and/or micelle nano-sizing compositions including: a nano-sizing solvent system comprising one or more polyterpene solvents, and a nano-sizing activator system comprising one or more dibasic esters. In certain embodiments, the polyterpene solvents comprise one or more sesquiterpenes of the general molecular formula $C_{15}H_{24}$ composed of three isoprene units; the dibasic esters comprise a single dialkyl dibasic ester or a mixture of dialkyl dibasic esters, wherein the alkyl group have between 1 and 8 carbon atoms; and the surfactants comprise (a) one or more cationic surfactants, or (b) one or more anionic surfactants, or (c) one or more zwitterionic or amphoteric surfactants, or (d) one or more anionic surfactants, or (e) mixtures and combinations thereof. In other embodiments, the sesquiterpenes include humulenes, farnesenes, or mixtures thereof; and the dialkyl dibasic esters comprise one or more dimethyl dibasic esters. In other embodiments, the humulenes include α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; the farnesenes include α-farnesene (3,7,11-trimethyl-1,3,6,10-dodecatetraene), β-farnesene (7,11-dimethyl-3-methylene-1,6,10-dodecatriene), or mixtures thereof; and the dimethyl dibasic esters include dimethyl $C_4$-$C_{12}$ dibasic esters, dimethyl $C_4$-$C_{10}$ dibasic esters, dimethyl $C_4$-$C_8$ dibasic esters, dimethyl $C_4$-$C_6$ dibasic esters, or mixtures thereof. In other embodiments, the sesquiterpenes include farnesenes; and the dimethyl dibasic esters include dimethyl $C_4$-$C_6$ dibasic esters. In other embodiments, the farnesenes include: α-farnesene (3,7,11-trimethyl-1,3,6,10-dodecatetraene), β-farnesene (7,11-dimethyl-3-methylene-1,6,10-dodecatriene), or mixtures thereof; and dimethyl $C_4$-$C_6$ dibasic esters include: dimethyl glutarate, dimethyl adipate, dimethyl succinate, or mixtures thereof.

Embodiments of the disclosure include fracturing or completion fluid compositions comprising: a base fluid, and a surfactant composition including: one or more surfactants; and a colloid and/or micelle nano-sizing compositions including: a nano-sizing solvent system comprising one or more polyterpene solvents, and a nano-sizing activator system comprising one or more dibasic esters. In certain embodiments, the polyterpene solvents comprise one or more sesquiterpenes of the general molecular formula $C_{15}H_{24}$ composed of three isoprene units; the dibasic esters comprise a single dialkyl dibasic ester or a mixture of dialkyl dibasic esters, wherein the alkyl group have between 1 and 8 carbon atoms; and the surfactants comprise (a) one or more cationic surfactants, or (b) one or more anionic surfactants, or (c) one or more zwitterionic or amphoteric surfactants, or (d) one or more anionic surfactants, or (e) mixtures and combinations thereof. In other embodiments, the sesquiterpenes include humulenes, farnesenes, or mixtures thereof and the dialkyl dibasic esters comprise one or more dimethyl dibasic esters. In other embodiments, the humulenes include α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof the farnesenes include α-farnesene (3,7,11-trimethyl-1,3,6,10-dodecatetraene), β-farnesene (7,11-dimethyl-3-methylene-1,6,10-dodecatriene), or mixtures thereof; the dimethyl dibasic esters include dimethyl $C_4$-$C_{12}$ dibasic esters, dimethyl $C_4$-$C_{10}$ dibasic esters, dimethyl $C_4$-$C_8$ dibasic esters, dimethyl $C_4$-$C_6$ dibasic esters, or mixtures thereof. In other embodiments, the sesquiterpenes include farnesenes; and the dimethyl dibasic esters include dimethyl $C_4$-$C_6$ dibasic esters In other embodiments, the farnesenes include: α-farnesene (3,7,11-trimethyl-1,3,6,10-dodecatetraene), β-farnesene (7,11-dimethyl-3-methylene-1,6,10-dodecatriene), or mixtures thereof and dimethyl $C_4$-$C_6$ dibasic esters include: dimethyl glutarate, dimethyl adipate, dimethyl succinate, or mixtures thereof. In other embodiments, the fluid compositions include one or more proppants.

Embodiments of the disclosure include method of making a fracturing fluid composition comprising: contacting, with mixing: a base fluid, and a surfactant composition including: one or more surfactants, and a colloid and/or micelle nano-sizing composition comprising: a nano-sizing solvent system comprising one or more polyterpene solvents, and a nano-sizing activator system comprising one or more dibasic esters. In certain embodiments, in the contacting step: the polyterpene solvents comprise one or more sesquiterpenes of the general molecular formula $C_{15}H_{24}$ composed of three isoprene units; the dibasic esters comprise a single dialkyl dibasic ester or a mixture of dialkyl dibasic esters, wherein the alkyl group have between 1 and 8 carbon atoms; and the surfactants comprise (a) one or more cationic surfactants, or (b) one or more anionic surfactants, or (c) one or more zwitterionic or amphoteric surfactants, or (d) one or more anionic surfactants, or (e) mixtures and combinations thereof. In other embodiments, in the contacting step, the sesquiterpenes include humulenes, farnesenes, or mixtures thereof; and the dialkyl dibasic esters comprise one or more dimethyl dibasic esters. In other embodiments, in the contacting step, the humulenes include α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; the farnesenes include α-farnesene (3,7,11-trimethyl-1,3,6,10-dodecatetraene), β-farnesene (7,11-dimethyl-3-methylene-1,6,10-dodecatriene), or mixtures thereof; the dimethyl dibasic esters include dimethyl $C_4$-$C_{12}$ dibasic esters, dimethyl $C_4$-$C_{10}$ dibasic esters, dimethyl $C_4$-$C_8$ dibasic esters, dimethyl $C_4$-$C_6$ dibasic esters, or mixtures thereof. In other embodiments, in the contacting step, the sesquiterpenes include farnesenes; and the dimethyl dibasic esters include dimethyl $C_4$-$C_6$ dibasic esters. In other embodiments, in the contacting step, the farnesenes include: α-farnesene (3,7,11-trimethyl-1,3,6,10-dodecatetraene), β-farnesene (7,11-dimethyl-3-methylene-1,6,10-dodecatriene), or mixtures thereof and dimethyl $C_4$-$C_6$ dibasic esters include: dimethyl glutarate, dimethyl adipate, dimethyl succinate, or mixtures thereof. In other embodiments, in the contacting step, the fluid composition further comprising one or more proppants.

Embodiments of the disclosure include methods of fracturing a formation comprising: injecting a fracturing or completion fluid into the formation under fracturing conditions or completion conditions, wherein the fracturing or completion fluid composition comprises: a base fluid, and a surfactant composition including: one or more surfactants, and a colloid and/or micelle nano-sizing composition comprising: a nano-sizing solvent system comprising one or more polyterpene solvents, and a nano-sizing activator system comprising one or more dibasic esters. In certain embodiments, The method of claim, wherein, in the injecting step, the polyterpene solvents comprise one or more sesquiterpenes of the general molecular formula $C_{15}H_{24}$ composed of three isoprene units; the dibasic esters comprise a single dialkyl dibasic ester or a mixture of dialkyl dibasic esters, wherein the alkyl group have between 1 and 8 carbon atoms; and the surfactants comprise (a) one or more cationic surfactants, or (b) one or more anionic surfactants, or (c) one or more zwitterionic or amphoteric surfactants, or (d) one or more anionic surfactants, or (e) mixtures and combinations thereof. In other embodiments, in the injecting step, the sesquiterpenes include humulenes, farnesenes, or mixtures thereof; and the dialkyl dibasic esters comprise one or more dimethyl dibasic esters. In other embodiments, in the injecting step, the humulenes include α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; the farnesenes include α-farnesene (3,7,11-trimethyl-1,3,6,10-dodecatetraene), β-farnesene (7,11-dimethyl-3-methylene-1,6,10-dodecatriene), or mixtures thereof; and the dimethyl dibasic esters include dimethyl $C_4$-$C_{12}$ dibasic esters, dimethyl $C_4$-$C_{10}$ dibasic esters, dimethyl $C_4$-$C_8$ dibasic esters, dimethyl $C_4$-$C_6$ dibasic esters, or mixtures thereof. In other embodiments, in the injecting step, the sesquiterpenes include farnesenes. In other embodiments, in the injecting step, the fluid compositions further comprise one or more proppants.

Embodiments of the disclosure include methods of fracturing a formation comprising: injecting one or more fracturing fluid compositions under fracturing conditions into the formation according to an injection protocol, wherein the one or more fluids include: (a) a colloid and/or micelle nano-sizing composition free and proppant free fracturing fluid composition, (b) proppant free fluids containing a colloid and/or micelle nano-sizing compositions including (1) a nano-sizing solvent system and (1) a nano-sizing activator system, (c) colloid and/or micelle nano-sizing composition free fluids including proppant; and/or (d) fluids including proppant and a colloid and/or micelle nano-sizing composition including (1) a nano-sizing solvent system and (1) a nano-sizing activator system, and wherein injection protocol comprising injecting the four fluids (a-d) in a sequence to build islands or pillars inside fractures during hydraulic fracturing. In certain embodiments, in the injecting step, the polyterpene solvents comprise one or more sesquiterpenes of the general molecular formula $C_{15}H_{24}$ composed of three isoprene units; the dibasic esters comprise a single dialkyl dibasic ester or a mixture of dialkyl dibasic esters, wherein the alkyl group have between 1 and 8 carbon atoms; and the surfactants comprise (a) one or more cationic surfactants, or (b) one or more anionic surfactants, or (c) one or more zwitterionic or amphoteric surfactants, or (d) one or more anionic surfactants, or (e) mixtures and combinations thereof. In other embodiments, in the injecting step, the sesquiterpenes include humulenes, farnesenes, or mixtures thereof; and the dialkyl dibasic esters comprise one or more dimethyl dibasic esters. In other embodiments, in the injecting step, the humulenes include α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; the farnesenes include α-farnesene (3,7,11-trimethyl-1,3,6,10-dodecatetraene), β-farnesene (7,11-dimethyl-3-methylene-1,6,10-dodecatriene), or mixtures thereof; and the dimethyl dibasic esters include dimethyl $C_4$-$C_{12}$ dibasic esters, dimethyl $C_4$-$C_{10}$ dibasic esters, dimethyl $C_4$-$C_8$ dibasic esters, dimethyl $C_4$-$C_6$ dibasic esters, or mixtures thereof. In other embodiments, in the injecting step: the sesquiterpenes include farnesenes; and the dimethyl dibasic esters include dimethyl $C_4$-$C_6$ dibasic esters. In other embodiments, in the injecting step, the farnesenes include: α-farnesene (3,7,11-trimethyl-1,3,6,10-dodecatetraene), β-farnesene (7,11-dimethyl-3-methylene-1,6,10-dodecatriene), or mixtures thereof; and dimethyl $C_4$-$C_6$ dibasic esters include: dimethyl glutarate, dimethyl adipate, dimethyl succinate, or mixtures thereof.

COMPOSITIONAL AND USE RANGES FOR USE IN THE DISCLOSURE

Component A

The nano-sizing solvent systems may include one or more sesquiterpene solvents. In certain embodiments, the nano-sizing solvent systems includes between about 5 wt. % and about 95% of β-farnesene and between about 95 wt. % and 5 wt. % α-farnesene. In other embodiments, the nano-sizing solvent systems includes between about 10 wt. % and about 90% of β-farnesene and between about 90 wt. % and 10 wt. % α-farnesene. In other embodiments, the nano-sizing solvent systems includes between about 15 wt. % and about 85% of β-farnesene and between about 85 wt. % and 15 wt. % α-farnesene. In other embodiments, the nano-sizing solvent systems includes between about 20 wt. % and about 80% of β-farnesene and between about 80 wt. % and 20 wt. % α-farnesene. In other embodiments, the nano-sizing solvent systems includes between about 25 wt. % and about 75% of β-farnesene and between about 75 wt. % and 25 wt. % α-farnesene. In other embodiments, the nano-sizing solvent systems includes between about 30 wt. % and about 70% of β-farnesene and between about 70 wt. % and 30 wt. % α-farnesene. In other embodiments, the nano-sizing solvent systems includes between about 40 wt. % and about 60% of β-farnesene and between about 60 wt. % and 40 wt. % α-farnesene. It should be recognized that the ranges may include any values between the specific ranges. Thus, a range of 1 to 10 covers any sub range between 1 and 10. It should also be recognized that nano-sizing solvent systems may include other combinations of different sesquiterpene solvents.

Component B

The nano-sizing activator systems may include one or more dibasic esters (dialkyl esters of di-carboxylic acids). In certain embodiments, the nano-sizing activator systems include 100 wt. % of a single dialkyl dibasic ester, wherein the alkyl group have between 1 and 8 carbon atoms. In other embodiments, the nano-sizing activator systems include a mixture of dialkyl dibasic esters, wherein the alkyl group have between 1 and 8 carbon atoms. In other embodiments, the nano-sizing activator systems include a mixture of dimethyl dibasic esters. In other embodiments, the nano-sizing activator systems include a mixture of dimethyl $C_4$-$C_{12}$ dibasic esters. In other embodiments, the nano-sizing activator systems include a mixture of dimethyl $C_4$-$C_{10}$ dibasic esters. In other embodiments, the nano-sizing activator systems include a mixture of dimethyl $C_4$-$C_8$ dibasic esters. In other embodiments, the nano-sizing activator systems include a mixture of dimethyl $C_4$-$C_6$ dibasic esters. In other embodiments, the nano-sizing activator systems include a mixture of dimethyl glutarate, dimethyl adipate, and dimethyl succinate. In other embodiments, the nano-sizing activator systems include a mixture of about 1 wt. % to about 98 wt. % dimethyl glutarate, about 1 wt. % to about 98 wt. % dimethyl adipate, and about 1 wt. % to about 98 wt. % dimethyl succinate. In other embodiments, the nano-sizing activator systems include a mixture of about 5 wt. % to about 90 wt. % dimethyl glutarate, about 5 wt. % to about 90 wt. % dimethyl adipate, and about 5 wt. % to about 90 wt. % dimethyl succinate. In other embodiments, the nano-sizing activator systems include a mixture of about 10 wt. % to about 80 wt. % dimethyl glutarate, about 10 wt. % to about 80 wt. % dimethyl adipate, and about 10 wt. % to about 80 wt. % dimethyl succinate. In other embodiments, the nano-sizing activator systems include a mixture of about 15 wt. % to about 70 wt. % dimethyl glutarate, about 15 wt. % to about 70 wt. % dimethyl adipate, and about 15 wt. % to about 70 wt. % dimethyl succinate. In other embodiments, the nano-sizing activator systems include a mixture of about 20 wt. % to about 60 wt. % dimethyl glutarate, about 20 wt. % to about 60 wt. % dimethyl adipate, and about 20 wt. % to about 60 wt. % dimethyl succinate. In other embodiments, the nano-sizing activator systems include a mixture of about 30 wt. % to about 40 wt. % dimethyl glutarate, about 30 wt. % to about 40 wt. % dimethyl adipate, and about 30 wt. % to about 40 wt. % dimethyl succinate. In other embodiments, the nano-sizing activator systems include a mixture of equal parts of dimethyl glutarate, dimethyl adipate and dimethyl succinate. These compositional ranges are effective for any combination of dibasic esters. Thus, if the mixture includes two dibasic esters, then the compositional range varies from 1 wt. % to 99 wt. % of each of the dibasic esters and any sub range between these values. If the mixture include four dibasic esters, then the compositional range varies from 1 wt. % to 97 wt. % of each of the dibasic esters and any sub range between these values. The same logic and compositional ranges variations would hold for mixtures that include five or more dibasic esters.

Ratio of Component A to Component B

The colloid and/or micelle nano-sizing compositions including mixtures of Component A and Component B. In certain embodiments, the mixtures include Component A and Component B is weight ratios of about 100:1, about 90:1, about 80:1, about 70:1, about 60:1, about 50:1, about 30:1, about 20:1, about 10:1, about 6:1, about 5:1, about 4:1, about 3:1, about 2:1, or 1:1 1. Again, it should be recognized that the ratios include any ratios between the specified ratios. Invention also include that ratio between nano-sizing agent and nano-sizing activator has a ratio of 1:1 to 100:1 where preferred ratio is 2:1 B 6:1.

Range of Addition of Colloid And/or Micelle Nano-Sizing Compositions in Downhole Fluids The colloid and/or micelle nano-sizing compositions may be added to a downhole fluid in amounts between about 0.05 gpt and about 5 gpt, between about 0.1 gpt and about 5 gpt, between about 0.5 gpt and about 5 gpt, between about 0.05 gpt and about 4 gpt, between about 0.1 gpt and about 4 gpt, between about 0.5 gpt and about 4 gpt, between about 0.05 gpt and about 3 gpt, between about 0.1 gpt and about 3 gpt, between about 0.5 gpt and about 3 gpt, between about 0.05 gpt and about 2 gpt, between about 0.1 gpt and about 2 gpt, between about 0.5 gpt and about 2 gpt, between about 0.05 gpt and about 1 gpt, between about 0.1 gpt and about 1 gpt, or between about 0.5 gpt and about 1 gpt. Again, it should be recognized that the ranges include any ranges between the specified ranges.

Suitable Components for Use in the Disclosure

Dibasic Esters

Suitable dibasic esters or di-carboxylic diesters used in the compositions of the present disclosure include, without limitation, linear, branched, and/or cyclic compounds and have the following formula:

$R^1$OOC—R—COOR$^2$ wherein $R^1$, and $R^2$ are independently hydrocarbyl groups having between 1 and 20 carbon atoms and R is a linking group (groups that link two groups or moieties, sometimes referred to herein as hydrocarbenyl groups B alkenyl groups, arenyl groups, etc.) having between 1 and 30 carbon atoms, where one or more of the hydrogen atoms may be replaced by halogen atoms, alkoxy groups, amide groups, and/or relatively inert groups and one or more of the carbon atoms may be replace by an oxygen atom or a sulfur atom. The hydrocarbyl groups may be alkyl groups, aryl groups, aralkyl groups, alkaryl groups, heterocyclic groups, or mixtures and combinations thereof. The alkyl groups or moieties (alkyl portion of aralkyl and alkaryl group) may be saturated or unsaturated, linear, branched, and/or cyclic. The linking groups are hydrocarbenyl groups (groups that link two groups or moieties). The hydrocarbenyl groups may be alkenyl, arenyl, aralkenyl, alkarenyl, heterocyclic, or mixtures and combinations thereof. The alkyl groups or moieties (alkyl portion of aralkyl and alkaryl group) may be saturated or unsaturated, linear, branched, and/or cyclic. Applicants recognize that the definition of a linking group and the use of the terminology "hydrocarbenyl group" as representing a linking group may be non-conventional, but it is used to distinguish groups bonded to a single group or moiety from groups bonded to or linking two or more groups or moieties.

In certain embodiments, the diesters used in the compositions of the present disclosure include, without limitation, compounds of the following formulas:

$R^1OOC$-alkenyl-$COOR^2$ $R^1OOC$-aralkenyl-$COOR^2$ $R^1OOC$-alkarenyl-$COOR^2$ $R^1OOC$-heterocyclic-$COOR^2$ where the R, $R^1$ and $R^2$ groups are defined above.

In other embodiments, the diesters used in the compositions of the present disclosure include, without limitation, compounds of the following formulas:

$R^1OOC-(CH_2)_q-COOR^2$ $R^1OOC-(CR^3R^4)_q-COOR^2$ $R^1OOC-(CR^3R^4)_r-(CH_2)_{q2}COOR^2$ $R^1OOC-(CH_2)_{q3}-(CR^3R^4)_r-COOR^2$ $R^1OOC-(CH_2)_{q3}-(CR^3R^4)_r-(CH_2)_{q4}-COOR^2$ where q is an integer having a value between 1 and 10, q1 is an integer having a value between 1 and 10, q2 is an integer having a value between 1 and 10, q3 and q4 are integers having values between 1 and 10, r is an integer having a value between 1 and 10, $R^3$ and $R^4$ may independently be a hydrogen atom or a hydrocarbyl group having between 1 and 20 carbon atoms or may form a cyclic group, and the R, $R^1$ and $R^2$ groups are defined above.

In other embodiments, the diesters used in the compositions of the present disclosure include, without limitation, diesters of the following diacids:

| Common Name | IUPAC Name | Formula | Isomer |
|---|---|---|---|
| oxalic acid | ethanedioic acid | $R^1OOC-COOR^2$ | |
| malonic acid | propanedioic acid | $R^1OOC-CH_2-COOR^2$ | |
| succinic acid | butanedioic acid | $R^1OOC-(CH_2)_2-COOR^2$ | |
| glutaric acid | pentanedioic acid | $R^1OOC-(CH_2)_3-COOR^2$ | |
| adipic acid | hexanedioic acid | $R^1OOC-(CH_2)_4-COOR^2$ | |
| pimelic acid | heptanedioic acid | $R^1OOC-(CH_2)_5-COOR^2$ | |
| suberic acid | octanedioic acid | $R^1OOC-(CH_2)_6-COOR^2$ | |
| azelaic acid | nonanedioic acid | $R^1OOC-(CH_2)_7-COOR^2$ | |
| sebacic acid | decanedioic acid | $R^1OOC-(CH_2)_8-COOR^2$ | |
| brassilic acid | undecanedioic acid | $R^1OOC-(CH_2)_9-COOR^2$ | |
| | dodecanedioic acid | $R^1OOC-(CH_2)_{10}-COOR^2$ | |
| | tridecanedioic acid | $R^1OOC-(CH_2)_{11}-COOR^2$ | |
| | tetradecanedioic acid | $R^1OOC-(CH_2)_{12}-COOR^2$ | |
| | pentadecanedioic acid | $R^1OOC-(CH_2)_{13}-COOR^2$ | |
| thapsic acid | hexadecanedioic acid | $R^1OOC-(CH_2)_{14}-COOR^2$ | |
| maleic acid | (Z)-butenedioic acid | $R^1OOC-CH=CH-COOR^2$ | cis |
| fumaric acid | (E)-butenedioic acid | $R^1OOC-CH=CH-COOR^2$ | trans |
| glutaconic acid | pent-2-enedioic acid | $R^1OOC-CH_2-CH=CH-COOR^2$ | cis & trans |
| traumatic acid | dodec-2-enedioic acid | $R^1OOC-CH=CH-(CH_2)_8-COOR^2$ | trans |
| muconic acid | (2E,4E)-hexa-2,4-dienedioic acid | $R^1OOC-CH=CH-CH=CH-COOR^2$ | trans, trans cis, trans cis,cis |
| glutinic acid | (RS)-2,3-pentadiene dioic acid | $R^1OOC-CH=C=CH-COOR^2$ | |
| citraconic acid | (2Z)-2-methylbut-2-enedioic acid | $R^1OOC-CH=C(CH_3)-COOR^2$ | cis |
| mesaconic acid | (2E)-2-methyl-2-butenedioic acid | $R^1OOC-CH=C(CH_3)-COOR^2$ | trans |
| itaconic acid | | $R^1OOC-CH_2-C(=CH_2)-COOR^2$ | |
| crocetin | | $R^1OOC-C(CH_3)=CH-CH=CH-C(CH_3)=CH-CH=CH-CH=C(CH_3)-CH=CH-CH=C(CH_3)-COOR^2$ | all trans |
| malic acid | hydroxybutanedioic acid | $R^1OOC-CH_2-CH(OH)-COOR^2$ | |
| aspartic acid | 2-aminobutanedioic acid | $R^1OOC-CH_2-CH(NH_2)-COOR^2$ | |
| glutamic acid | 2-aminopentanedioic acid | $R^1OOC-(CH_2)_2-CH(NH_2)-COOR^2$ | |
| tartronic acid | 2-hydroxy propanedioic acid | $R^1OOC-CH(OH)-COOR^2$ | |
| tartaric acid | 2,3-dihydroxy butanedioic acid | $R^1OOC-CH(OH)-CH(OH)-COOR^2$ | |
| diaminopimelic acid | (2R,6S)-2,6-diamino heptanedioic acid | $R^1OOC-CH(NH_2)-(CH_2)_4-CH(NH_2)-COOR^2$ | |
| saccharic acid | (2S,3S,4S,5R)-2,3,4,5-tetrahydroxy hexanedioic acid | $R^1OOC-(CH(OH))_5-COOR^2$ | |
| mesoxalic acid | oxopropanedioic acid | $R^1OOC-C(O)-COOR^2$ | |
| oxaloacetic acid | oxobutanedioic acid | $R^1OOC-C(O)-CH_2-C(O)-COOR^2$ | |
| acetone dicarboxylic acid | 3-oxopentanedioic acid | $R^1OOC-CH_2-C(O)-CH_2-COOR^2$ | |
| arabinaric acid | 2,3,4-trihydroxy pentanedioic acid | $R^1OOC-(CH(OH))_3-COOR^2$ | |
| o-phthalic acid | benzene-1,2-dicarboxylic acid | $R^1OOC-o$-phenyl$-COOR^2$ | |

-continued

| Common Name | IUPAC Name | Formula | Isomer |
|---|---|---|---|
| m-phthalic acid | benzene-1,3-dicarboxylic acid | $R^1OOC$—m-phenyl—$COOR^2$ | |
| p-phthalic acid | benzene-1,4-dicarboxylic acid | $R^1OOC$—p-phenyl—$COOR^2$ | |
| biphenyl-2,2-dicarboxylic acid | 2-(2-carboxyphenyl)benzoic acid | $R^1OOC$—o-phenyl-o-phenyl—$COOR^2$ | |
| 2,6-naphthalene dicarboxylic acid | 2,6-naphthalene dicarboxylic acid | $R^1OOC$—2-6-naphthenyl—$COOR^2$ | |

In other embodiments, the diesters used in the compositions of the present disclosure include, without limitation, dialkyl succinate, dialkyl glutarate, dialkyl glutarate, dialkyl adipate, dialkyl adipicate, dialkyl pimelicate, dialkyl subericate, dialkyl azelaicate, dialkyl sebacicate, dialkyl brassylicate, dialkyl dodecanedioicate, dialkyl traumaticate, dialkyl thapsicate, or mixtures and combinations thereof.

In other embodiments, the diesters used in the compositions of the present disclosure include, without limitation, dimethyl succinate, dimethyl glutarate, dimethyl glutarate, dimethyl adipate, dimethyl adipicate, dimethyl pimelicate, dimethyl subericate, dimethyl azelaicate, dimethyl sebacicate, dimethyl brassylicate, dimethyl dodecanedioicate, dimethyl traumaticate, dimethyl thapsicate, methyl, ethyl succinate, methyl, ethyl glutarate, methyl, ethyl glutarate, methyl, ethyl adipate, methyl, ethyl adipicate, methyl, ethyl pimelicate, methyl, ethyl subericate, methyl, ethyl azelaicate, methyl, ethyl sebacicate, methyl, ethyl brassylicate, methyl, ethyl dodecanedioicate, methyl, ethyl traumaticate, methyl, ethyl thapsicate, diethyl succinate, diethyl glutarate, diethyl glutarate, diethyl adipate, diethyl adipicate, diethyl pimelicate, diethyl subericate, diethyl azelaicate, diethyl sebacicate, diethyl brassylicate, diethyl dodecanedioicate, diethyl traumaticate, diethyl thapsicate, or mixtures and combinations thereof.

Polyterpenes and Sesquiterpenes

Suitable polyerterpenes include, without limitation, a class of terpenes composed of three or more isoprene units. In certain embodiments, the sesquiterpenes, triterpenes, tetraterpenes, and mixtures or combinations thereof.

Suitable sesquiterpenes include, without limitation, a class of terpenes composed of three isoprene units of the general molecular formula $C_{15}H_{24}$. Exemplary examples of sesquiterpenes include, without limitation, humulenes, farnesenes, and mixtures thereof. Exemplary examples of humulenes include, without limitation, α-humulene or α-caryophyllene (2,6,6,9-tetramethyl-1,4-8-cycloundecatriene), β-caryophyllene (2,6,6,9-tetramethyl-1,4-8-cycloundecatriene), and mixtures thereof. Exemplary examples of farnesenes include, without limitation, α-farnesene (3,7,11-trimethyl-1,3,6,10-dodecatetraene), β-farnesene (7,11-dimethyl-3-methylene-1,6,10-dodecatriene), and mixtures thereof.

Surfactants

Suitable surfactants for use in this disclosure include, without limitation, anionic surfactants, cationic surfactants, zwitterionic surfactants, non-ionic surfactants, or mixtures and combinations thereof.

Anionic Surfactants

Suitable anionic surfactants include, without limitation, anionic sulfate surfactant, alkyl ether sulfonates, alkylaryl sulfonates, or mixture or combinations. In certain embodiments, the anionic surfactants include, without limitation, sodium or ammonium alcohol ether sulfate surfactants include those having the general formula $R^aO$—$(CH_2CH_2O)_nSO_3NH_4$, where $R_a$ is a carbon-containing group including an alkyl group, an aryl group, an alkaryl group, an aralkyl group or mixture thereof. In other embodiments, the anionic surfactants include, without limitation, sodium or ammonium alcohol ether sulfate surfactants include short chain sodium or ammonium alcohol ether sulfate surfactants having between 2 and about 10 carbon atoms or between about 4 and 10 carbon atoms and long chain sodium or ammonium alcohol ether sulfate surfactants having between about 10 to about 24 carbon atoms or between about 12 and about 18 carbon atoms or between about 12 and about 14 carbon atoms. In other embodiments, the anionic surfactants include, without limitation, sodium ammonium alcohol ether sulfate surfactants prepared by reacting 1 to 10 moles of ethylene oxide per mole of an alkanol or 3 moles of ethylene oxide per mole of an alkanol.

Suitable alkylaryl sulfonates include, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

Suitable alkyl ether sulfonates include, without limitation, alkyl ether sulfonates having the general formula $R^b[$—(O—$R^cO)_m$—$(R^dO)_n$—$(R^e)]_y$, where: $R^b$=alkyl, alkenyl, amine, alkylamine, dialkylamine, trialkylamine, aromatic, polyaromatic, cycloalkane, cycloalkene, $R^c$ and $R^d$=$C_2H_4$ or $C_3H_6$ or $C_4H_8$, $R^d$=linear or branched $C_7H_{14}SO_3X$ to $C_{30}H_{60}SO_3X$ when y=1, $R^e$=linear or branched $C_7H_{14}SO_3X$ to $C_{30}H_{60}SO_3X$ or H when y>1 but at least one $R^d$ must be linear or branched $C_7H_{14}SO_3X$ to $C_{30}H^{60}SO_3X$, m is greater or equal to 1, n is greater or equal to 0, n+m=1 to 30+, y is greater or equal to 1, X=alkali metal or alkaline earth metal or ammonium or amine.

Cationic Surfactants

Suitable cationic surfactants include, without limitation, Gemini, bis or di quaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether(DCEE). In certain embodiments, the bis quaternary ammonium halides are prepared from substituted dimethyl tertiary amines, where the substituent includes between about 4 and about 30 carbon atoms, between about 6 and about 24 carbon atoms, or between about 8 and about 24 carbon atoms, and where one or more of the carbon atoms can be replace by an oxygen atom in the form of an ether and/or hydroxyl moiety and/or a nitrogen atom is the form of an amido moiety. In other embodiments, the bis quaternary ammonium halides hydrocarbons are prepared from naturally occurring acids, such as fatty acids, synthetic acids, modified naturally occurring acids, or mixture or combinations thereof. In certain embodiments, the acids are naturally occurring acids are those found in naturally occurring oils such as coconut oil, palm oil, palm kernel oil, soya, safflower oil, sunflower oil, peanut oil, canola oil, or from animal such as tallow oil and its derivatives. In other embodiments, the bis quaternary ammonium halides are prepared from disubstituted methyl-tertiaryamines, where the substituents include between about 4 and about 30 carbon atoms, between about 6 and about 24 carbon atoms, or between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine (DMAPA) or similar terminated primary-tertiary diamines, reacted with the above mentioned oils or their corresponding fatty acids, or hydroxy acids. In other embodiments, the cationic surfactants are dimer acids or anhydrides including alkylsubstituted maleic anhydride, alkylsubstituted diethylmalonic acid, or alkylsubstituted higher diacids such as azelaic acid (C9), trimer acids as NTA(nitriloac etic acid), and aconitic acid and trimetellic anhydride are useful though producting a higher trimer. the tertiary amine may be accomplished by reaction of a diamine with a fatty acid or oil, reacting with one amine and then converting the other primary amine to tertiary by the addition of tetrahydrofuran, ethylene oxide, propylene oxide, butylene oxide, epichlorohydrin, or the like and further where the terminal hydrogens of the primary amine may be alkylated using formaldehyde/formic acid mixtures.

Zwitterionic or Amphoteric Surfactants

Suitable zwitterionic or amphoteric surfactants include, without limitation: (1) any compound having the general structure $R^fR^gR^hN^+$—$R^iCO_2^-$, where $R^f$, $R^g$ and $R^h$ are the same or different carbon-containing group, amido carbon-containing group, ether carbon-containing group, or mixtures thereof, and $R^i$ is an alkenyl group, alkenyloxide group or mixtures thereof; (2) any compound having the general structure $R^j(R^gR^hN^+$—$R^iCO_2^-$, where $R^g$ and $R^h$ are the same or different carbon-containing group, amido carbon-containing group, ether carbon-containing group, or mixtures thereof, $R^i$ is an alkenyl group, alkenyloxide group or mixtures thereof, and $R^j$ is a multivalent substituent having a valency n between 2 and about 6, e.g., $CH_2$ moiety when n is 2, a CH moiety when n is 3 and a C atom when n is 4; (3) any compound having the general structure $R^l$—C(O)—N($R^k$)—$R^m$—$N^+(R^gR^h)$—$R^i$—$CO_2^-$, where $R^g$, $R^h$, $R^k$ and $R^l$ are the same or different carbon-containing group, amido carbon-containing group, ether carbon-containing group, or mixtures thereof, and $R^i$ and $R^m$ are the same or different alkenyl group, alkenyloxide group or mixtures thereof; (4) any compound having the general structure $R^n$—[$R^o$—C(O)—N($R^k$)—$R^m$—$N^+(R^gR^h)$—$R^i$—$CO_2^-$]$_m$, where $R^g$, $R^h$ and $R^k$ are the same or different carbon-containing group, amido carbon-containing group, ether carbon-containing group, or mixtures thereof, $R^i$, $R^m$ and $R^o$ are the same or different alkenyl group, alkenyloxide group or mixtures thereof and $R^n$ is a multivalent substituent having a valency m between 2 and about 6; other similar ammonium acid zwitterionic agent; or mixtures or combinations thereof. In other embodiments, the zwitterionic compounds are betaines such as cocamidopropyl betaine, 5-(1-piperidiniomethyl)-1H-tetrazolide, or similar zwitterionic compounds. In other embodiments, the zwitterionic compounds for use in this invention include, without limitation, phospholipids capable of assuming a zwitterionic state such as phosphatidylcholine, phosphatidylserine, phosphalidylethanolamine, sphingomyelin and other ceramides, as well as various other zwitterionic phospholipids. In certain embodiments, the sulfo-betaines and related zwitterionic compounds include, without limitation, N-Decyl-N,N-dimethyl-3-ammonio-1-propanesulfonate; Dimethylbenzyl-(3-sulfopropyl)ammonium; Dimethylethyl-(3-sulfopropyl)ammonium; Dimethyl-(2-hydroxyethyl)-(3-sulfopropyl)ammonium; 4-n-Hexylbenzoylamido-propyl-dimethylammoniosulfobetaine; β-Methyl-N-(3-sulfopropyl)morpholinium; 4-n-Octylbenzoylamido-propyl-dimethylammoniosulfobetaine; 1-(3-Sulfopropyl)pyridium; N-Tetradecyl-N,N-Dimethyl-3-Ammonio-1-Propanesulfonate, or the like or mixtures or combination thereof.

Nonionic Sufactants

Suitable nonionic sufactants include, without limitation, alkyl polyglycosides, polyethylene glycol hexadecyl ethers, cetostearyl alcohols, cetyl alcohol, cocamide/diethanolamine, cocamide/monoethanolamine, decyl glucosides, decyl polyglucoses, glycerol monostearates, octylphenoxypolyethoxyethanols, polyethylene glycol ethers, lauryl glucosides, maltosides, monolaurins, mycosubtilins, narrow-range ethoxylates, 4-nonylphenyl-polyethylene glycol, ethoxylated nonoxynols, polyethylene glycol nonyl phenyl ethers, onyl phenoxypolyethoxylethanols, octaethylene glycol monododecyl ethers, N-octyl beta-d-thioglucopyranosides, octyl glucosides, oleyl alcohol, polyethylene glycols derived from sunflower glycerides, pentaethylene glycol monododecyl ethers, ethoxylated dodecanols, nonionic triblock copolymers composed of a central hydrophobic chain ofpolyoxypropylene (poly(propylene oxide)) flanked by two hydrophilic chains of polyoxyethylene (poly(ethylene oxide)), polyethoxylated tallow amines, polyglycerol polyricinoleates, polysorbates, sorbitans, sorbitan monolaurates, sorbitan monostearates, sorbitan tristearates, stearyl alcohol, bacterial cyclic lipopeptides, hydrophilic polyethylene oxides, polyoxyethylene sorbitan monooleates, and mixtures or combinations thereof.

Winterizing Agents

Suitable winterizing agents include, without limitation, formate salts such as lithium formate, sodium formate, potassium formate, cesuim formate, triethyanolamine formate, or the like or mixtures or combinations.

Hydratable Polymers

Suitable hydratable polymers include, without limitation, one or more synthetic hydratable polymers, natural hydratable polymers, and mixtures or combinations thereof.

Synthetic Hydratable Polymers

Suitable synthetic hydratable polymers for use in the present invention include, without limitation, (a) polyvinyl alcohol polymers and copolymers, (b) polyacrylamide polymers and copolymers, (c) poly-2-amino-2-methyl propane sulfonic acid polymers (AMPS) and copolymers, (d) polyacrylic acid polymers and copolymers, (e) polymethacrylic acid polymers and copolymers, (f) high molecular weight homo- and/or copolymers of acrylic acid crosslinked with polyalkenyl polyethers, (g) high molecular weight hydrophobically modified, cross-linked polyacrylate polymers, (h) hydrophilic, anionic, high molecular weight, cross-linked polyacrylic acid polymers, (i) for those polymers that have hydrolyzable groups, the polymers may be hydrolyzed to any desired degree, and (j) mixtures or combinations thereof.

Natural Hydratable Polymers

Suitable natural hydratable water soluble polymers for use in this invention include, without limitation, polysaccharides and mixtures or combinations thereof. Suitable polysaccharides include galactomannan gum and cellulose derivatives. In certain embodiments, the polysaccharides include guar gum, locust bean gum, carboxymethylguar, hydroxyethyl-guar, hydroxypropylguar, carboxymethylhydroxypropylguar, carboxymethylhydroxyethylguar, hydroxymethyl cellulose, carboxymethylhydroxyethyl cellulose, and hydroxyethyl cellulose and mixtures or combinations thereof.

The natural hydratable polymer useful in the present invention can be any of the hydratable polysaccharides having galactose or mannose monosaccharide components and are familiar to those in the well service industry. These polysaccharides are capable of gelling in the presence of a crosslinking agent to form a gelled based fluid. For instance, suitable hydratable polysaccharides are the galactomannan gums, guars and derivatized guars. Specific examples are guar gum and guar gum derivatives. Suitable gelling agents are guar gum, hydroxypropyl guar and carboxymethyl hydroxypropyl guar. In certain embodiment, the hydratable polymers for the present invention are guar gum and carboxymethyl hydroxypropyl guar and hydroxypropyl guar. Other exemplary fracturing fluid formulations are disclosed in U.S. Pat. Nos. 5,201,370 and 6,138,760, which are incorporated herein by reference. In other embodiments, the hydratable natural polysaccharides include, without limitation, guar gum, guar gum derivatives, locust bean gum, Karaya gum, carboxymethyl cellulose, carboxymethyl hydroxyethyl cellulose, hydroxyethyl cellulose, or mixtures and combinations thereof. In other embodiments, the hydratable natural polysaccharides include, without limitation, guar gums, hydroxypropyl guar, carboxymethyl hydroxypropyl guar, carboxymethyl guar, carboxymethyl hydroxyethyl cellulose, or mixtures and combinations thereof.

Proppants

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

Besides the proppant concentrations in the final formulation, the particles sizes of the proppants are also a factor in the performance of the fluids of this invention. In certain embodiments, the proppants have sizes of 16/20 mesh, 16/30 mesh, 20/40 mesh and mixtures and combinations thereof. In addition, proppant density is another factor in the performance of the fluids of this invention. Exemplary examples of the proppants useful in this invention include, without limitation, CARBO-HSP® 16/30 mesh and 20/40 mesh having a bulk density=2 g/cm³ and CARBO-LITE® 16/20 mesh and 20/40 mesh having a bulk density=1.57 g/cm³, and mixtures or combinations thereof.

Gases

Suitable gases for foaming the fluid of this invention include, without limitation, nitrogen, carbon dioxide, or any other gas suitable for use in formation fracturing, or mixtures or combinations thereof.

Other Additives

The fracturing fluids of this invention can also include other additives as well such as scale inhibitors, friction reducers, crosslinkers, carbon dioxide control additives, paraffin control additives, oxygen control additives, biocides, gel stabilizers, surfactants, clay control additives, or other additives.

Base Fluids

Suitable base fluids for use in the fluids of this disclosure include, without limitation, aqueous base fluids or non-aqueous (hydrocarbon or oil based) base fluids. The aqueous base fluids include, without limitation, free water, tap water, production water, brines, or mixtures thereof, wherein the waters may include one or more additives, the brines include one or more dissolved salts and the additives may be any additives listed herein. The non-aqueous (hydrocarbon or oil based) base fluids include, without limitation, petroleum distillates such as medicinal oil, diesel, jet fuel, paraffins, isoparaffins, cycloparaffins, other petroleum distillates, terpenes such as polyterpenes including terpenes composed of three or more isoprene units, e.g., sesquiterpenes, triterpenes, tetraterpenes, and mixtures or combinations thereof.

EXPERIMENTS OF THE DISCLOSURE

First Series of Experiments

Colloid and micelle non-sized compositions were prepared using equal molar amounts of a cationic surfactant and a nonionic surfactant, with or without a Component A or a mixture of a Component A and a Component B. These three blends were formulated to illustrate the effect of a Components A alone or in combination with a Component B.

Example 1

This illustrates the preparation of a cation/nonionic colloid and micelle non-sized composition of this disclosure including a Component A and a Component B.

To 87.59 wt. % water were added 9.24 wt. % of bis(hydroxyethyl)coco benzyl ammonium chloride available from Stepan, 1.58 wt. % seven-mole ethoxylated linear, primary 12-14 carbon number alcohol available from Huntsman, 1.27 wt. % of a mixture of α-farnesene and β-farnesene available from Keane Group, and 0.32 wt. % of a mixture of dimethyl glutarate, dimethyl adipate and dimethyl succinate available from Keane Group, with mixing.

Example 2

This illustrates the preparation of a cation/nonionic colloid and micelle non-sized composition of this disclosure including a Component A.

To 87.96 wt. % water were added 9.22 wt. % of bis(hydroxyethyl)coco benzyl ammonium chloride available from Stepan, 1.56 wt. % seven-mole ethoxylated linear, primary 12-14 carbon number alcohol available from Huntsman, and 1.27 wt. % of a mixture of α-farnesene and β-farnesene available from Keane Group, with mixing.

Control 1

This illustrates the preparation of a cation/nonionic colloid and micelle non-sized control composition, which includes no Component A, no Component B or no mixture of a Component A and a Component B.

To 89.19 wt. % water were added 9.24 wt. % of bis(hydroxyethyl)coco benzyl ammonium chloride available from and 1.57 wt. % seven-mole ethoxylated linear, primary 12-14 carbon number alcohol available from Huntsman, with mixing.

The first series compositions are tabulated in Table 1 in weight percentage (wt. %) for ease of comparison and the z-Average values are in nanometers (nm).

TABLE 1

Composition Make Up of Examples 1-2 and Control 1

| Ingredient | Example 1 | Example 2 | Control 1 |
|---|---|---|---|
| water | 87.59 | 87.95 | 89.19 |
| cationic surfactant | 9.24 | 9.22 | 9.24 |
| nonionic surfactant | 1.58 | 1.56 | 1.57 |
| Component A | 1.27 | 1.27 | 0.0 |
| Component B | 0.32 | 0.0 | 0.0 |
| z-Average | 66 | 206 | 124 |

Each of the compositions was tested for colloidal particle size using a Malvern NanoSizer.

The data show that the flowback aids of this disclosure including a Component A and a Component B resulted in colloid and/or micelle composition having particles diameters less than 100 nm. The data also indicates the addition of the Component B, the activator, to the Component A lowers the colloid diameter and interfacial tension more than Component A alone. Thus, there is a synergistic effect when both the Component A and the Component B are used in the colloid and/or micelle compositions of this disclosure.

The data in Table 1 showed that the colloid size is less than 100 nm (i.e., 66 nm) for Example 1 when both the Component A and the Component B is used, while the colloid size is greater than 100 nm (i.e., 124 nm) for Control 1, which includes neither the Component A or the Component B. In fact, when only the Component A, Example 2, is used, the colloid size is not only greater than 100 nm (i.e., 206 nm) but the colloid size is larger than the colloid size for Control 1.

Second Series of Experiments

Colloid and micelle non-sized compositions were prepared using equal molar amounts of an anionic surfactant and a nonionic surfactant, with or without the Component A or a mixture of the Component A and the Component B. These three blends were formulated to illustrate the effect of the Components A alone or in combination with the Component B.

Example 3

This illustrates the preparation of an anion/nonionic colloid and micelle non-sized composition of this disclosure including a Component A and a Component B.

To 81.74 wt. % water were added 11.50 wt. % of dodecylbenzene sulfonic acid/monoethanolamine salt (DDBSA-MEA) available from Gulf Scientific, 2.92 wt. % seven-mole ethoxylated linear, primary 12-14 carbon number alcohol available from Huntsman, 2.90 wt. % of isopropanol, 0.75 wt. % of a mixture of α-farnesene and β-farnesene available from Keane Group (a Component A), and 0.21 wt. % of a mixture of dimethyl glutarate, dimethyl adipate and dimethyl succinate available from Keane Group (a Component B), with mixing.

Example 4

This illustrates the preparation of an anionic/nonionic colloid and micelle non-sized composition of this disclosure including Component A.

To 81.93 wt. % water were added 11.50 wt. % of dodecylbenzene sulfonic acid/monoethanolamine salt (DDBSA-MEA) available from Gulf Scientific, 2.90 wt. % seven-mole ethoxylated linear, primary 12-14 carbon number alcohol available from Huntsman, 2.91 wt. % of isopropanol, and 0.76 wt. % of a mixture of α-farnesene and β-farnesene available from Keane Group (a Component A), with mixing.

Control 2

This illustrates the preparation of an anion/nonionic colloid and micelle non-sized control composition, which includes no Component A, no Component B, or no mixture of Components A and B.

To 82.63 wt. % water were added 11.53 wt. % of dodecylbenzene sulfonic acid/monoethanolamine salt (DDBSA-MEA) available from Gulf Scientific, 2.93 wt. % seven-mole ethoxylated linear, primary 12-14 carbon number alcohol available from Huntsman, 2.91 wt. % of isopropanol, with mixing.

The second series compositions are tabulated in Table 2 in weight percentage (wt. %) for ease of comparison, the z-Average values are in nanometers (nm), and the interfacial tension values in millinewtons per meter (mN/m).

TABLE 2

Composition Make Up of Examples 3-4 and Control 2

| Ingredient | Example 3 | Example 4 | Control 2 |
|---|---|---|---|
| water | 81.74 | 81.93 | 82.63 |
| Isopropanol | 2.90 | 2.91 | 2.91 |
| Anionic Surfactant | 11.5 | 11.5 | 11.53 |
| Nonionic Surfactant | 2.92 | 2.90 | 1.93 |
| Component A | 0.75 | 0.76 | 0.0 |
| Component B | 0.21 | 0.0 | 0.0 |
| z-Average | 34 | 41 | 100 |
| Spinning Drop Tension* | 0.0007 | 0.0049 | 0.0011 |

*The interfacial tension between Permian Brackish water and Wolfcamp B Crude Oil with no added surfactants is 11.34 mN/m).

Each of the compositions was tested for colloidal particle size using a Malvern NanoSizer and interfacial tension using a Spinning Drop Tensiometer.

The data in Table 2 demonstrate that the composition of Example 3 including a Component A and a Component B synergistically reduce the colloid particle size from about 100 nm for Control 2 to 34 nm and reduces the interfacial tension from 0.0011 mM/m to 0.0007 mN/m. Colloid size was higher (i.e., 41 nm) for the composition of Example 4 including only the Component A still much lower than the 100 nm for Control 2 that does not include either the Component A or the Component B.

Third Series of Experiments

Example 5

Example 5 is composed of a surfactant package including 11.5 wt. % DDBSA-MEA and 2.92 wt. % 7EO Ethoxylated 12-14 carbon alcohol and a colloid and/or micelle nano-sizing compositions of this disclosure including 0.75 wt. % of a Component A and 0.20% of a Component B, 2.91 wt. % Isopropanol, and 81.72 wt. % water. Example 5 has excellent interfacial tension of 0.0007 mN/m and an excellent z-average colloid particle size of 34 nm.

Comparative Example 1

Example 6 is composed of a surfactant package, KS-17 B a blend of surfactants, available from Keane Group, which has excellent emulsion breaking properties having an interfacial tension of 0.1897 mN/m and z-average colloid particles size of 154 nm.

Spontaneous Imbibition Oil Recovery Test Protocol

The spontaneous imbibition test was carried out as follows.

Prepare Shale Core

Weight a wire mesh cylinder. Pour about 100 g of 5:10 mesh shale into the wire mesh cylinder. Weigh and record the weight in grams of shale and the wire mesh cylinder. Dry the wire mesh cylinder and shale. Weight and record the weight in grams of the dry shale and the wire mesh cylinder. Then, place the wire mesh cylinder containing the dry shale in a glass beaker.

Saturate Core

Weigh each stainless steel rolling oven cell. Pre-fill the weighed stainless steel rolling oven cell with 225 mL of Wolfcamp-B crude oil. Place a sample of the dried shale in the cell. Seal the cell. Place the sealed cell under pressure a pressure of 300 psi into water bath set at bottom hole temperature for 7 days. Release the pressure in the cell. Open the cell and remove the shale from crude oil. Weigh the cylinder and the saturated shale to determine the weight of saturated shale. Determine a difference between the weight of the oil-saturated shale and weight of the dry shale. Determine a total volume of oil in the saturated shale by dividing the difference by the density of the crude oil.

Assemble Amott Cell

Place a sample of the saturated oil shale in the Amott cell and a treating fluid in the cell. Place the Amott cell containing the saturated shale and the oil recovery fluid and place in an oven @ 130° F. Keep the oven closed, except during sampling.

Record Test Results

Remove the Amott cell from the oven hourly over a 6 hour period of time and withdraw a sample of the fluid. Determine a volume (mL) of oil recovered from or released from the core each hour based on the amount of crude oil in the sample. Convert the hourly volumes of oil released by the shale into a % volume released over the six hour period. Plot the % volume recovered over time.

Oils Recovery (FR) is calculated as follows:

$$\% FR(t) = [V(t)/PV] \times 100$$

wherein V is volume of oil released in Amott Cell, PV is the pour volume given by PV=M/ρ, M is mass of oil absorbed into the core, and ρ is density of crude oil, 0.829.

Treating Fluids

Each treating fluid included a specific amount of a surfactant packaged added to brackish water having the analysis tabulated in Table 3.

TABLE 3

Brackish Water Analysis

| Anions | mg/L | me-q/L | Cations | mg/L | me-q/L |
|---|---|---|---|---|---|
| Chlorides | 4637.50 | 130.78 | Sodium | 2775.00 | 120.71 |
| Sulfates | 2127.80 | 44.26 | Calcium | 817.20 | 40.86 |
| Bicarbonates | 195.00 | 3.20 | Magnesium | 272.30 | 2241 |
| Carbonates | 0.00 | 0.00 | Barium | 0.00 | 0.00 |
| Hydroxides | 0.00 | 0.00 | Strontium | 49.09 | 1.12 |
| Phosphates | 0.00 | 0.00 | Potassium | 41.75 | 1.07 |
| Silica | 0.00 | | Iron | 0.00 | 0.00 |
| pH | 7.87 | | Chromium | 0.00 | 0.00 |
| | | | Manganese | 0.00 | 0.00 |

Five treating fluids were tested. Fluid A is a blank or control treating fluid including only the brackish water. Fluid B is a treating fluid including 0.5 gpt of the Control 2 in the brackish water. Fluid C is a treating fluid including 1.0 gpt of Control 2 in the brackish water. Fluid D is a treating fluid including 0.5 gpt of Example 3 in the brackish water. Fluid E is a treating fluid including 1.0 gpt of Example 3 in the brackish water.

Referring now to the FIGURE, a plot of percentage of oil recovery (Oil Recovery (%)) against time in hours is shown for the five treating Fluid A (solid light gray line B the line coincides with x-axis except for last half and hour), Fluid B (dotted dark gray line), Fluid C (dashed dark gray line), Fluid D (dotted black line), and Fluid E (dashed black line). The data show that treating fluid including the surfactant package of Example 3, which include a nano-sizing composition of this disclosure, had greater % oil recovery at 0.5 gpt and 1.0 gpt compared to equivalent concentrations of the surfactant package of Control 2, which did not include a nano-sizing composition of this disclosure. Fluid D had a maximum % oil recovery value after 6 hours of about 43% compared to Fluid B that had a maximum % oil recovery value after 6 hours of about 16%, representing a 269% improvement in % oil recovery. Fluid E had a maximum % oil recovery value after 6 hours of about 43% compared to a Fluid C that had a maximum % oil recovery value after 6 hours of about 27%, representing a 159% improvement in % oil recovery. It is interesting to note that the surfactant systems that did not include the nano-sizing composition of this invention showed a higher recovery at 0.5 gpt and about half as much at 1.0 gpt. In contrast, the nano-sizing compositions of this disclosure had very similar % oil recovery at both 0.5 gpt and 1.0 gpt. The similarity between the % oil recovery at the two levels suggest that the nano-sizing compositions of this disclosure may be effective in gpt values less than 0.5 gpt and shows that surfactant packages including any amount of the nano-sizing compositions of this disclosure will have enhanced oil recovery compared to surfactant system that did not include the nano-sizing compositions of this disclosure.

CLOSING PARAGRAPH OF THE DISCLOSURE

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:
1. A method of fracturing a formation comprising:
injecting a fracturing fluid composition or completion fluid composition into the formation under fracturing conditions or completion conditions, the fracturing fluid composition or completion fluid composition comprising:
a base fluid, and
a surfactant composition including:
(a) a mixture of one or more nonionic surfactants and one or more anionic surfactants or (b) a mixture of one or more nonionic surfactants and one or more cationic surfactants; and
a colloid and/or micelle size reducing composition comprising:
a solvent system comprising one or more sesquiterpenes, and
an activator system comprising one or more dibasic esters; and
a proppant,
wherein the colloid and/or micelle size reducing composition reduces a size of colloids or micelles to less than or equal to 100 nm in the fracturing fluid composition or completion fluid composition.

2. The method of claim 1, wherein, in the injecting step:
the one or more sesquiterpenes comprise compounds of the general molecular formula of $C_{15}H_{24}$ composed of three isoprene units; or
the one or more dibasic esters comprise a single dialkyl dibasic ester or a mixture of dialkyl dibasic esters, wherein the alkyl groups of the dialkyl dibasic esters have between 1 and 8 carbon atoms; or
the base fluid comprises an aqueous base fluid or a non-aqueous base fluid, the aqueous base fluid comprises fresh water, tap water, production water, brines, or mixtures thereof or the non-aqueous base fluid comprises petroleum distillates, diesel, jet fuel, paraffins, isoparaffins, cycloparaffins, terpenes or mixtures thereof.

3. The method of claim 1, wherein, in the injecting step:
the one or more sesquiterpenes comprise one or more humulenes, one or more farnesenes, or mixtures thereof; or
the one or more dialkyl dibasic esters comprise one or more dimethyl dibasic esters.

4. The method of claim 3, wherein, in the injecting step:
the one or more humulenes comprise α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; or
the one or more farnesenes comprise α-farnesene (3,7,11-trimethyl-1,3,6,10-dodecatetraene), β-farnesene (7,11-dimethyl-3-methylene-1,6,10-dodecatriene), or mixtures thereof; or
the one or more dimethyl dibasic esters comprise one or more dimethyl $C_4$-$C_{12}$ dibasic esters, one or more dimethyl $C_4$-$C_{10}$ dibasic esters, one or more dimethyl $C_4$-$C_8$ dibasic esters, dimethyl $C_4$-$C_6$ dibasic esters, or mixtures thereof.

5. The method of claim 1, wherein, in the injecting step:
the one or more sesquiterpenes comprise one or more farnesenes; or
the one or more dimethyl dibasic esters comprise one or more dimethyl $C_4$-$C_6$ dibasic esters.

6. The method of claim 5, wherein, in the injecting step:
the one or more farnesenes comprise:
α-farnesene (3,7,11-trimethyl-1,3,6,10-dodecatetraene),
β-farnesene (7,11-dimethyl-3-methylene-1,6,10-dodecatriene), or
mixtures thereof; or
the one or more dimethyl $C_4$-$C_6$ dibasic esters comprise:
dimethyl glutarate,
dimethyl adipate,
dimethyl succinate, or
mixtures thereof.

7. The method of claim 1, wherein, in the injecting step:
the one or more anionic surfactants comprise one or more anionic sulfate surfactants, one or more alkyl ether sulfonate surfactants, one or more alkylaryl sulfonate surfactants, or mixtures thereof; or
the one or more cationic surfactants comprise one or more gemini, bis, or di quaternary ammonium surfactants or mixtures thereof; or
the one or more non-ionic surfactants comprise one or more alkyl polyglycoside surfactants, one or more polyethylene glycol hexadecyl ether surfactants, one or more cetostearyl alcohol surfactants, cetyl alcohol, one or more cocamide/diethanolamine surfactants, one or more cocamide/monoethanolamine surfactants, one or more decyl glucoside surfactants, one or more decyl polyglucose surfactants, one or more glycerol monostearate surfactants, one or more octylphenoxypolyethoxyethanol surfactants, one or more polyethylene glycol ether surfactants, one or more lauryl glucoside surfactants, one or more maltoside surfactants, one or more monolaurin surfactants, one or more mycosubtilin surfactants, one or more 4-nonylphenyl-polyethylene glycol surfactants, one or more ethoxylated nonoxynol surfactants, one or more polyethylene glycol nonyl phenyl ether surfactants, one or more octaethylene glycol monododecyl ether surfactants, one or more N-octyl beta-d-thioglucopyranoside surfactants, one or more octyl glucoside surfactants, oleyl alcohol, one or more polyethylene glycol surfactants derived from sunflower glycerides, one or more pentaethylene glycol monododecyl ether surfactants, one or more ethoxylated dodecanol surfactants nonionic triblock copolymer surfactants composed of a central hydrophobic chain of polyoxypropylene (poly(propylene oxide)) flanked by two hydrophilic chains of polyoxyethylene (poly(ethylene oxide)), one or more polyethoxylated tallow amine surfactants, one or more polyglycerol polyricinoleate surfactants, one or more polysorbate surfactants, one or more sorbitan surfactants, stearyl alcohol, one or more bacterial cyclic lipopeptide surfactants, one or more hydrophilic polyethylene oxide surfactants, one or more polyoxyethylene sorbitan monooleate surfactants, or mixtures thereof.

8. The method of claim 1, wherein, in the injecting step, the fracturing fluid composition or completion fluid composition further comprising:
one or more zwitterionic surfactants comprising:
(1) one or more compounds comprising the structure:

wherein $R^f$, $R^g$, and $R^h$ are the same or different carbon-containing group, amido carbon-containing group, ether carbon-containing group, or mixtures thereof, and $R^i$ is an alkenyl group, alkenyloxide group or mixtures thereof; or (2) one or more compounds comprising the structure:

wherein R$^g$ and R$^h$ are the same or different carbon-containing group, amido carbon-containing group, ether carbon-containing group, or mixtures thereof, R$^i$ is an alkenyl group, alkenyloxide group or mixtures thereof, and R$^j$ is a multivalent substituent having a valency n between 2 and about 6; or (3) one or more compounds comprising the structure:

wherein R$^g$, R$^h$, R$^k$ and R$^l$ are the same or different carbon-containing group, amido carbon-containing group, ether carbon-containing group, or mixtures thereof, and R$^i$ and R$^m$ are the same or different alkenyl group, alkenyloxide group or mixtures thereof; or (4) one or more compounds comprising the structure:

wherein R$^g$, R$^h$ and R$^k$ are the same or different carbon-containing group, amido carbon-containing group, ether carbon-containing group, or mixtures thereof, R$^l$, R$^m$ and R$^o$ are the same or different alkenyl group, alkenyloxide group or mixtures thereof and R$^n$ is a multivalent substituent having a valency m between 2 and about 6; or (5) one or more betaines; or
(6) one or more sulfo-betaines; or
(7) one or more phospholipids; or
(8) mixtures thereof.

9. The method of claim 1, further comprising:
prior to the injecting step, initially injecting an initial fracturing fluid composition or initial completion fluid composition into the formation under fracturing conditions or completion conditions, the initial fracturing fluid composition or initial completion fluid composition comprising:
an initial base fluid, and
an initial surfactant composition comprising:
(a) an initial mixture of one or more nonionic surfactants and one or more anionic surfactants or (b) an initial mixture of one or more nonionic surfactants and one or more cationic surfactants, and
an initial colloid and/or micelle size reducing composition comprising:
a solvent system comprising one or more sesquiterpenes, and
an activator system comprising one or more dibasic esters,
wherein the initial colloid and/or micelle size reducing composition reduces a size of colloids or micelles to less than or equal to 100 nm in the initial fracturing fluid composition or initial completion fluid composition.

10. The method of claim 9, wherein, in the initial injecting step:
the one or more sesquiterpenes comprise compounds of the general molecular formula of $C_{15}H_{24}$ composed of three isoprene units; or
the one or more dibasic esters comprise a single dialkyl dibasic ester or a mixture of dialkyl dibasic esters, wherein the alkyl groups of the dialkyl dibasic esters have between 1 and 8 carbon atoms; or the base fluid comprises an aqueous base fluid or a non-aqueous base fluid; or
the aqueous base fluids comprising fresh water, tap water, production water, brines, or mixtures thereof; or
the non-aqueous base fluid comprises petroleum distillates, diesel, jet fuel, paraffins, isoparaffins, cycloparaffins, terpenes or mixtures thereof.

11. The method of claim 9, wherein, in the initial injecting step:
the one or more sesquiterpenes comprise one or more humulenes, one or more farnesenes, or mixtures thereof; or
the one or more dialkyl dibasic esters comprise one or more dimethyl dibasic esters.

12. The method of claim 11, wherein, in the initial injecting step:
the one or more humulenes comprise α-humulene or α-caryophyllene (2,6,6,9-tetramethyl-1,4-8-cycloundecatriene), β-caryophyllene (2,6,6,9-tetramethyl-1,4-8-cycloundecatriene), or mixtures thereof; or
the one or more farnesenes comprise α-farnesene (3,7,11-trimethyl-1,3,6,10-dodecatetraene), β-farnesene (7,11-dimethyl-3-methylene-1,6,10-dodecatriene), or mixtures thereof; or
the one or more dimethyl dibasic esters comprise one or more dimethyl $C_4$-$C_{12}$ dibasic esters, one or more dimethyl $C_4$-$C_{10}$ dibasic esters, one or more dimethyl $C_4$-$C_8$ dibasic esters, dimethyl $C_4$-$C_6$ dibasic esters, or mixtures thereof.

13. The method of claim 9, wherein, in the initial injecting step:
the one or more sesquiterpenes comprise one or more farnesenes; or
the one or more dimethyl dibasic esters comprise one or more dimethyl $C_4$-$C_6$ dibasic esters.

14. The method of claim 13, wherein, in the initial injecting step:
the one or more farnesenes comprise:
α-farnesene (3,7,11-trimethyl-1,3,6,10-dodecatetraene),
β-farnesene (7,11-dimethyl-3-methylene-1,6,10-dodecatriene), or
mixtures thereof; or
the one or more dimethyl $C_4$-$C_6$ dibasic esters comprise:
dimethyl glutarate,
dimethyl adipate,
dimethyl succinate, or
mixtures thereof.

15. The method of claim 9, wherein, in the initial injecting step:
the one or more anionic surfactants comprise one or more anionic sulfate surfactants, one or more alkyl ether sulfonate surfactants, one or more alkylaryl sulfonate surfactants, or mixtures thereof; or
the one or more cationic surfactants comprise one or more gemini, bis, or di quaternary ammonium surfactants or mixtures thereof; or
the one or more non-ionic surfactants comprise one or more alkyl polyglycoside surfactants, one or more polyethylene glycol hexadecyl ether surfactants, one or more cetostearyl alcohol surfactants, cetyl alcohol, one or more cocamide/diethanolamine surfactants, one or more cocamide/monoethanolamine surfactants, one or more decyl glucoside surfactants, one or more decyl polyglucose surfactants, one or more glycerol monostearate surfactants, one or more octylphenoxypolyethoxyethanol surfactants, one or more polyethylene glycol ether surfactants, one or more lauryl glucoside surfactants, one or more maltoside surfactants, one or more monolaurin surfactants, one or more mycosubtilin surfactants, one or more 4-nonylphenyl-polyethylene glycol surfactants, one or more ethoxylated nonoxynol surfactants, one or more polyethylene glycol nonyl phenyl ether surfactants, one or more octaethylene glycol monododecyl ether surfactants, one or more N-octyl beta-d-thioglucopyranoside surfactants, one or more octyl glucoside surfactants, oleyl alcohol, one or more polyethylene glycol surfactants derived from sunflower glycerides, one or more pentaethylene glycol monododecyl ether surfactants, one or more ethoxylated dodecanol surfactants nonionic triblock copolymer surfactants composed of a central hydrophobic chain of polyoxypropylene (poly(propylene oxide)) flanked by two hydrophilic chains of polyoxyethylene (poly(ethylene oxide)), one or more polyethoxylated tallow amine surfactants, one or more polyglycerol polyricinoleate surfactants, one or more polysorbate surfactants, one or more sorbitan surfactants, stearyl alcohol, one or more bacterial cyclic lipopeptide surfactants, one or more hydrophilic polyethylene oxide surfactants, one or more polyoxyethylene sorbitan monooleate surfactants, or mixtures thereof.

16. The method of claim 9, wherein, in the injecting step, the fracturing fluid composition or completion fluid composition further comprising:

one or more zwitterionic surfactants comprising:

(1) one or more compounds comprising the structure:

wherein $R^f$, $R^g$, and $R^h$ are the same or different carbon-containing group, amido carbon-containing group, ether carbon-containing group, or mixtures thereof, and $R^i$ is an alkenyl group, alkenyloxide group or mixtures thereof; or (2) one or more compounds comprising the structure:

wherein $R^g$ and $R^h$ are the same or different carbon-containing group, amido carbon-containing group, ether carbon-containing group, or mixtures thereof, $R^i$ is an alkenyl group, alkenyloxide group or mixtures thereof, and $R^j$ is a multivalent substituent having a valency n between 2 and about 6; or (3) one or more compounds comprising the structure:

wherein $R^g$, $R^h$, $R^k$ and $R^l$ are the same or different carbon-containing group, amido carbon-containing group, ether carbon-containing group, or mixtures thereof, and $R^i$ and $R^m$ are the same or different alkenyl group, alkenyloxide group or mixtures thereof; or (4) one or more compounds comprising the structure:

wherein $R^g$, $R^h$ and $R^k$ are the same or different carbon-containing group, amido carbon-containing group, ether carbon-containing group, or mixtures thereof, $R^l$, $R^m$ and $R^o$ are the same or different alkenyl group, alkenyloxide group or mixtures thereof and $R^n$ is a multivalent substituent having a valency m between 2 and about 6; or (5) one or more betaines; or
(6) one or more sulfo-betaines; or
(7) one or more phospholipids; or
(8) mixtures thereof.

* * * * *